(12) United States Patent
Shimizu

(10) Patent No.: US 8,723,483 B2
(45) Date of Patent: May 13, 2014

(54) BATTERY MONITORING DEVICE

(75) Inventor: Takumi Shimizu, Yokkaichi (JP)

(73) Assignee: Denso Corporation, Kariya (JP)

( * ) Notice: Subject to any disclaimer, the term of this patent is extended or adjusted under 35 U.S.C. 154(b) by 715 days.

(21) Appl. No.: 13/025,595

(22) Filed: Feb. 11, 2011

(65) Prior Publication Data

US 2011/0199051 A1 Aug. 18, 2011

(30) Foreign Application Priority Data

Feb. 12, 2010 (JP) ................... 2010-028580

(51) Int. Cl.
*H02J 7/00* (2006.01)
(52) U.S. Cl.
USPC ............ 320/122; 320/116; 320/118; 320/119
(58) Field of Classification Search
USPC ........................................................ 320/122
See application file for complete search history.

(56) References Cited

U.S. PATENT DOCUMENTS

2006/0119319 A1* 6/2006 Sakurai et al. ................ 320/116
2011/0080138 A1* 4/2011 Nakanishi ..................... 320/116
2011/0127963 A1* 6/2011 Murao et al. .................. 320/118

FOREIGN PATENT DOCUMENTS

JP 2006-166615 6/2006

* cited by examiner

*Primary Examiner* — Edward Tso
*Assistant Examiner* — Johali Torres Ruiz
(74) *Attorney, Agent, or Firm* — Nixon & Vanderhye P.C.

(57) ABSTRACT

There is disclosed a battery monitoring device including a voltage equalization circuit that equalizes cell voltages of a plurality of battery cells being connected in series and forming a battery pack, and a microcomputer that outputs an instruction signal to instruct the voltage equalization circuit to start an voltage equalizing operation for the battery cells. The microcomputer includes a first timer section that stops the voltage equalizing operation a first predetermined set time after the start of the voltage equalizing operation, and the voltage equalization circuit includes a second timer section that stops the voltage equalizing operation a second predetermined set time after the start of the voltage equalizing operation. This can enhance reliability during the voltage equalizing operation.

17 Claims, 2 Drawing Sheets

BATTERY MONITORING DEVICE

CROSS-REFERENCE TO RELATED APPLICATION

This application is based on and claims the benefit of priority from earlier Japanese Patent Application No. 2010-28580 filed Feb. 12, 2010, the description of which is incorporated herein by reference.

BACKGROUND

1. Technical Field of the Invention

This invention relates to a battery monitoring device that monitors a battery pack including a plurality of battery cells connected in series.

2. Related Art

There is known a conventional battery monitoring device which equalizes cell voltages of a plurality of battery cells forming a battery pack through discharge or charge-transfer in each battery cell so as to reduce a variation in cell voltage among the battery cells in the battery pack. Japanese Patent Application Publication No. 2006-166615 discloses a battery monitoring device intended to reduce electrical power consumption due to accidental discharge or the like which may occur during equalizing cell voltages of battery cells forming a battery pack. This battery monitoring device is provided with monitoring means (in particular, equalizing means) for monitoring cell voltages of the battery cells. The monitoring means includes a timer to stop an equalizing operation a predetermined time after start of the equalizing operation.

In the above conventional technique, however, when a failure occurs in the timer of the monitoring means, it becomes unable to stop the equalizing operation at proper timing, which may lead to accidental discharge or charge-transfer in each battery cell. Accordingly, in the conventional battery monitoring device, it is not possible to sufficiently ensure reliability during the equalizing operation.

In consideration of the foregoing, exemplary embodiments of the present invention are directed to providing a battery monitoring device that can equalize cell voltages of a plurality of battery cells forming a battery pack and can enhance reliability during the equalizing operation.

SUMMARY

In accordance with an exemplary aspect of the present invention, there is provided a battery monitoring device including a voltage equalization circuit for equalizing cell voltages of a plurality of battery cells being connected in series and forming a battery pack, and control means for outputting an instruction signal to instruct the voltage equalization circuit to start an voltage equalizing operation for the battery cells. In the battery monitoring device, the control means includes a first timer section that stops the voltage equalizing operation a first predetermined set time after the start of the voltage equalizing operation, and the voltage equalization circuit includes a second timer section that stops the voltage equalizing operation a second predetermined set time after the start of the voltage equalizing operation.

As above, the control means and the voltage equalization circuit are provided with the first and second timer sections, respectively. Thus, in cases where either one of the timer sections is malfunctioning or has a failure, the equalizing operation can be stopped by the other timer section that is normally operating, which leads to enhancement of reliability during the equalizing operation as compared with conventional battery monitoring devices.

DESCRIPTION OF SPECIFIC EMBODIMENTS

The present inventions will be described more fully hereinafter with reference to the accompanying drawings. Like numbers refer to like elements throughout.

First Embodiment

Figure 1:
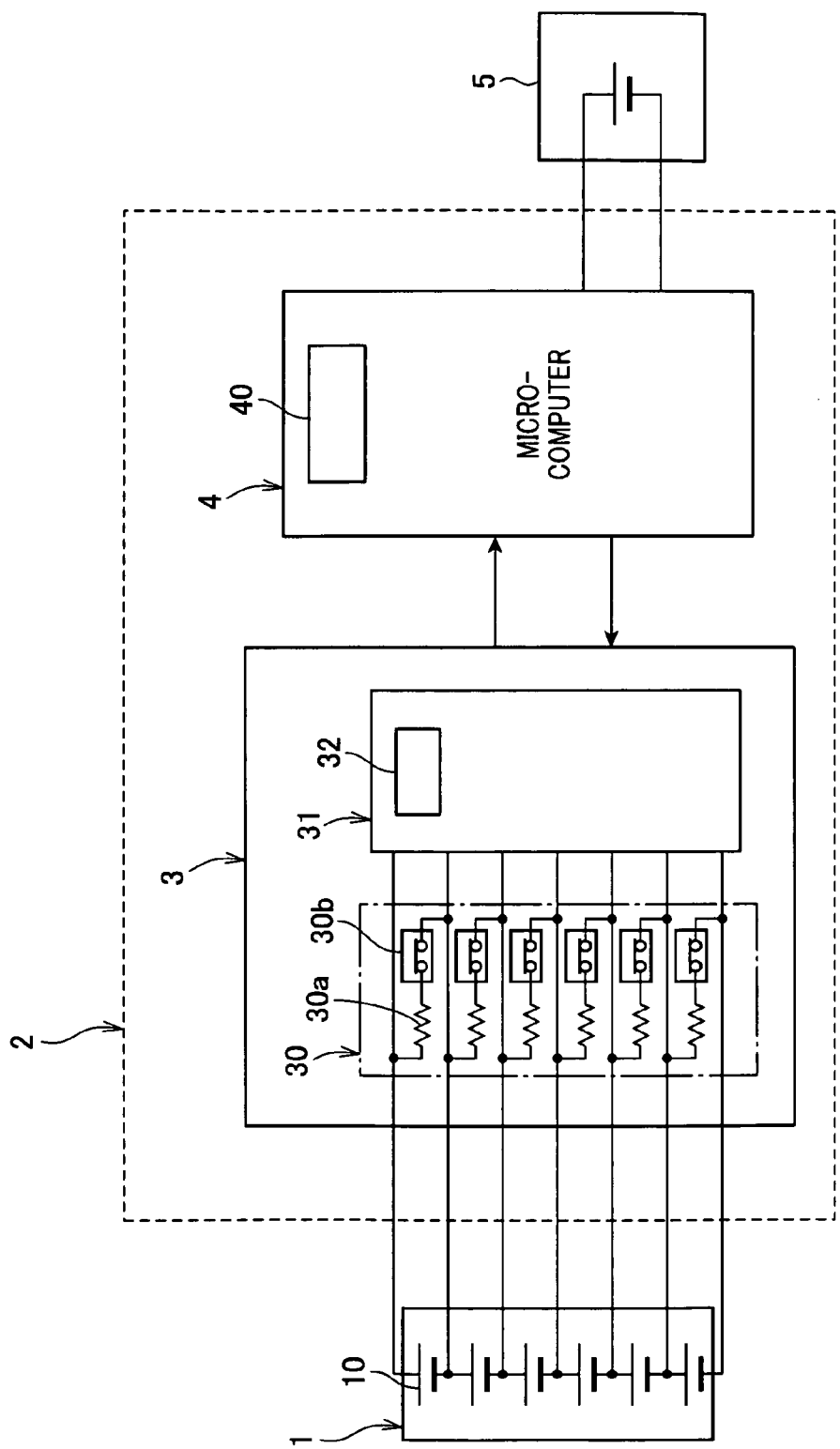
FIG. 1 is a schematic block diagram of a battery monitoring system in accordance with a first embodiment of the present invention.

There will now be explained a first embodiment of the is present invention with reference to FIG. 1. FIG. 1 is a schematic block diagram of a battery monitoring system including a battery monitoring device of the present embodiment. As shown in FIG. 1, the battery monitoring system includes a battery pack 1 and a battery monitoring device 2.

The battery pack 1, in which a plurality of battery cells 10 are connected in series, is a voltage source that is capable of generating a fixed voltage. The battery pack 1 of the present embodiment is composed of six battery cells 10 being connected in series. The battery pack 1 of the present embodiment may be mounted on an electric vehicle such as a hybrid car or the like, and may be used as a power source for driving a load such an inverter and a motor.

Each of the battery cells 10 forming the battery pack 1 may be a rechargeable secondary battery. In the present embodiment, the battery cell 10 may be, but is not limited to, a lithium ion secondary battery. It should be noted that the battery cell 10 may be a lead battery instead of a lithium ion secondary battery.

The battery monitoring device 2 is a device that implements at least a voltage equalizing function for equalizing a variation in cell voltage among the battery cells 10. The battery monitoring device 2 of the present embodiment includes a voltage equalization circuit 3 that equalizes the variation in cell voltage among the battery cells 10, and a microcomputer 4 that is capable of outputting various instruction signals to the voltage equalization circuit 3 and other components.

The voltage equalization circuit 3 is a circuit for regulating (or reducing) a variation in cell voltage among the battery cells 10 by detecting the cell-voltage variation and then allowing an electric current to flow from a cathode of a battery cell 10 whose voltage is higher than those of the other battery cells 10 to an anode of the higher voltage battery cell.

The voltage equalization circuit 3 includes a discharging section 30, a discharge-regulating section 31, and an input and output section (not shown). The voltage equalization circuit 3 operates supplied with power from the battery pack 1 (or a corresponding battery cell 10) as a power source. The voltage equalization circuit 3 of the present embodiment takes a form of an integrated circuit (referred to as a monitoring IC).

The discharging section 30 of the voltage equalization circuit 3 includes resistors 30$a$ each connected in parallel with its corresponding battery cell 10, and switches 30$b$ each connected in series with its corresponding resistor 30a. When each switch 30b is turned on, an electrical current flows from the cathode of the corresponding battery cell 10 to its anode through the corresponding resistor 30a and the switch 30b. This enables the cell voltage of the battery cell 10 to be lowered. That is, the discharging section 30 serves as a discharging bypass circuit. Each switch 30b of the discharging section 30 is ON/OFF-controlled in response to an instruction signal from the microcomputer 4 during an equalization process which will described later.

The discharge-regulating section 31 is adapted to regulate discharged amounts of the battery cells 10, which includes a cell-voltage detector (not shown) and a circuit-side timer section 32.

The cell-voltage detector of the discharge-regulating section 31 detects a voltage difference between both ends of each battery cell 10. A detection result from the cell-voltage detector is outputted to the microcomputer 4, and then the microcomputer 4 determines a battery cell 10 for which an equalizing operation should be performed in the discharging section 30. The cell-voltage detector may not be limited to a component of the discharge-regulating section 31 in the voltage equalization circuit 3, but may be, for example, a separate and independent component from the voltage equalization circuit 3.

The circuit-side timer section 32 counts a lapsed time after the discharging section 30 has started the discharging operation (also referred to as an equalizing operation), and stops the equalizing operation a predetermined time period after the discharging section 30 has started the equalizing operation. That is, the circuit-side timer section 32 turns off the switch 30b of the discharging section 30 a predetermined time period after the turn-on of the switch 30b.

The circuit-side timer section 32 of the present embodiment is composed of a timer that utilizes, for example, a RC oscillation circuit including a capacitor and a resistor, or a LC oscillation circuit including a coil and a capacitor. The circuit-side timer section 32 has a timer period set therein (hereinafter, referred to as a circuit-side set time T1), which defines timing at which the equalizing operation in the discharging section 30 is stopped (the switch is turned off).

The input and output section of the voltage equalization circuit 3 is responsible for inputting an instruction signal from the microcomputer 4 and outputting to the microcomputer 4 a result outputted from the cell-voltage detector, an end-indication signal indicating that the equalizing operation in the discharging section 30 has been ended, and a count value of the circuit-side timer section 32.

The microcomputer 4 includes a CPU (not shown), a ROM (not shown), a RAM (not shown), and a control-side timer section 40, and performs various operations by executing programs stored in the ROM or the like.

The microcomputer 4 of the present embodiment is connected to the voltage equalization circuit 3. In addition, the microcomputer 4 outputs to the voltage equalization circuit 3 instruction signals for instructing start timing and stop timing of the equalizing operation, and performs various processes including a failure detecting process that detects a timer failure on the basis of an outputted signal from the voltage equalization circuit 3.

Similar to the circuit-side timer section 32, the control-side timer section 40 incorporated in the microcomputer 4 counts a lapsed time after the equalizing operation has been started in the discharging section 30, and stops the equalizing operation a predetermined time period after the equalizing operation has been started in the discharging section 30.

Specifically, the control-side timer section 40 of the present embodiment is composed of a timer that utilizes an oscillator such as a crystal oscillator or a ceramic resonator. Although an oscillator that utilizes a crystal oscillator or a ceramic resonator or the like is relatively high in cost compared with oscillators such as the RC oscillation circuit and the LC oscillation circuit as used in the circuit-side timer section 32, it is higher in output frequency stability and higher in output accuracy. Thus, the control-side timer section 40 of the present embodiment is a timer section that is higher in time accuracy than the circuit-side timer section 32. In other words, the circuit-side timer section 32 of the present embodiment is a timer section that is lower in time accuracy than the control-side timer section 40. For example, a timer with a time accuracy per predetermined time period (e.g., 60 minutes) of 1% or less may be used for the control-side timer section 40, and a timer with a time accuracy per predetermined time period (e.g., 60 minutes) of 20% or less may be used for the circuit-side timer section 32.

Similar to the circuit-side timer section 32, the control-side timer section 40 has a timer period set therein (hereinafter, referred to as a control-side set time T2), which defines timing at which the equalizing operation in the discharging section 30 is stopped (the switch is turned off).

In the present embodiment, the circuit-side set time T1 is set to be larger than the control-side set time T2 (T1>T2). Thus, the stop timing at which the control-side timer section 40 stops the discharging operation in the discharging section 30 is reached prior to the stop timing at which the circuit-side timer section 32 stops the discharging operation in the discharging section 30. That is, in stopping the discharging operation in the discharging section 30 of the voltage equalization circuit 3, the control-side timer section 40 is given priority over the circuit-side timer section 32, thereby allowing the discharging operation in the discharging section 30 to be normally stopped by the control-side timer section 40 that is higher in time accuracy.

A power source for the microcomputer 4 is an auxiliary battery 5 different from and independent of the battery cells 10, and the microcomputer 4 operates supplied with power from the auxiliary battery 5. That is, in the present embodiment, the microcomputer 4 and the voltage equalization circuit 3 are supplied with power from different power sources.

There will now be explained an equalization process that performs the equalizing operation for each battery cell 10 in the battery monitoring device 2 in accordance with the first embodiment of the present invention. The equalization process is started with an instruction signal instructing start of the equalizing operation being outputted from the microcomputer 4 to the voltage equalization circuit 3.

Once the instruction signal instructing start of the equalizing operation is inputted from the microcomputer 4 to the voltage equalization circuit 3, the voltage equalization circuit 3 detects a variation in cell voltage among the battery cells 10 forming the battery pack 1 by the discharge-regulating section 31 (in particular, the cell-voltage detector) detecting the cell voltages of the battery cells 10, and then outputs a result of the detected cell voltage variation to the microcomputer 4.

The microcomputer 4 determines, on the basis of a degree of the detected cell-voltage variation, for which battery cell 10 with a higher cell-voltage among the battery cells 10 the discharging operation is required, and then determines a time period during which the equalizing operation should be performed for the determined battery cell 10 (in the present embodiment, the circuit-side set time T1 and the control-side set time T2). In the microcomputer 4, the circuit-side set time T1 and the control-side set time T2 are determined such that the circuit-side set time T1 is larger than the control-side set time T2.

After a set time for each timer section 32, 40 has been determined, the microcomputer 4 sets a control-side set time T2 for the control-side timer section 40, and then outputs an instruction signal to instruct the voltage equalization circuit 3 to perform (or start) the equalizing operation. The instruction signal outputted from the microcomputer 4 to the voltage equalization circuit 3 contains an instruction to instruct the discharging section 30 to turn on the switch 30b for the determined battery cell 10 and an instruction to instruct the circuit-side timer section 32 to set the circuit-side set time T1 therein.

Upon turn-on of the switch 30b corresponding to the higher cell-voltage battery cell determined by the microcomputer 4, the discharging process is started. The circuit-side timer section 32 and the control-side timer section 40 each count a lapsed time after the start of the equalizing operation in the voltage equalization circuit 3.

As described above, since the circuit-side set time T1 for the circuit-side timer section 32 is set to be larger than the control-side set time T2 for the control-side timer section 40, the equalizing operation will be stopped by the control-side timer section 40 with higher accuracy in time prior to the circuit-side timer section 32 stopping the equalizing operation. This enables the equalizing operation in the voltage equalization circuit 3 to be stopped even in cases where the circuit-side timer section 32 is malfunctioning.

More specifically, once the lapsed time after the start of the equalizing operation in the voltage equalization circuit 3 has reached the control-side set time T2 for the control-side timer section 40, the microcomputer 4 outputs the instruction signal to instruct the voltage equalization circuit 3 to stop the equalizing operation. That is, once a count value of the control-side timer section 40 has reached a count value corresponding to the control-side set time T2, the switch 30b in the discharging section 30 is turned off.

However, at and before the time the equalizing operation should be stopped by the microcomputer 4, there may occur a failure such as malfunction of the microcomputer 4 (a failure in the control-side timer section 40 on the microcomputer 4 side) or deficiency in power supply in the auxiliary battery 5 that supplies electric power to the microcomputer 4.

In such a case, once the lapsed time after the start of the equalizing operation in the voltage equalization circuit 3 has reached the circuit-side set time T1 for the circuit-side timer section 32, the equalizing operation in the voltage equalization circuit 3 is stopped by the circuit-side timer section 32. That is, in cases where an instruction signal to instruct the voltage equalization circuit 3 to stop the equalizing operation is not outputted from the microcomputer 4 at proper timing (i.e., timing at which the lapsed time after the start of the equalizing operation reaches the control-side set time T2), the equalizing operation will be reliably stopped by the circuit-side timer section 32.

In this way, the microcomputer 4 performs the above operations for each battery cell 10 that requires the above equalization process one after another to equalize the variation in cell voltage.

There will now be explained a failure detecting process to be performed on the microcomputer 4. The failure detecting process is a process to detect a timer failure during the equalizing operation being performed in the voltage equalization circuit 3.

For an example of the failure detecting process, during the equalizing operation being performed in the voltage equalization circuit 3, the microcomputer 4 detects count values of the timer sections 32, 40 corresponding to the lapsed times counted by the timer sections 32, 40 respectively after the start of the equalizing operation in the voltage equalization circuit 3. The microcomputer 4 detects differences between the detected count values of the timer sections 32, 40 by mutually comparing the detected count values.

The microcomputer 4 then determines whether or not there exists a count-value difference that exceeds (or is out of) a normal range. If it is determined that there exists a count-value difference that exceeds the normal range, it is then determined that there is a failure in the timer sections (either one or both of the timer sections 32, 40) of the battery monitoring device 2 (occurrence of a timer failure).

The above mentioned "normal range" is defined on the basis of a time accuracy of each timer section 32, 40. For example, given a time accuracy per predetermined time period (e.g., 60 minutes) of 1% or less for the control-side timer section 40 and a time accuracy per predetermined time period (e.g., 60 minutes) of 20% or less for circuit-side timer section 32, the normal range may be set to be equal to or below a sum (21%) of their time accuracies.

In the above embodiment, the voltage equalization circuit 3 and the microcomputer 4 are each provided with a dedicated timer section (i.e., the circuit-side timer section 32 for the voltage equalization circuit 3 and the control-side timer section 40 for the is microcomputer 4) to stop the equalizing operation, thereby providing redundant means for stopping the equalizing operation. Even in cases where there exists a failure in one of the circuit-side timer section 32 for the voltage equalization circuit 3 and the control-side timer section 40 for the microcomputer 4 is malfunctioning, this enables the other timer section that is normally operating to stop the equalizing operation.

Therefore, the battery monitoring device of the present embodiment can significantly improve reliability during the equalizing operation as compared with conventional battery monitoring devices in which only the voltage equalization circuit 3 is provided with means for stopping the equalizing operation.

In addition, in the present embodiment, the control-side timer section 40 and the voltage equalization circuit 3 provided with the circuit-side timer section 32 are supplied with electrical power from different power sources, thereby providing a redundant power source for means for stopping the equalizing operation.

Therefore, even in cases where there exists a failure in one of the power source for the voltage equalization circuit 3 (the battery pack 1 composed of the battery cells 10) and the power source for the microcomputer 4 (the auxiliary battery 5), this allows the timer section supplied with electrical power from the normally operating power source to stop the equalizing operation, which leads to further improvement of reliability during the equalizing operation as compared with cases where the voltage equalization circuit 3 and the microcomputer 4 are supplied with electrical power from a common power source. If a failure occurs in the common power source, all the timer sections in the voltage equalization circuit 3 and the microcomputer 4 will probably malfunction.

In addition, in the present embodiment, the control-side timer section 40 for the microcomputer 4 is adapted to use an is oscillator higher in time accuracy than an oscillator used in the circuit-side timer section 32 for the voltage equalization circuit 3. This can prevent multiplication of such a higher accuracy timer section, thereby facilitating time management of the equalizing operation and thus preventing accidental discharge from occurring during the equalizing operation while preventing increase in cost.

It should be noted that when the equalizing operation is performed a lower time accuracy of the timer section may lead to accidental discharge or charge-transfer. As a solution to this problem, use of a timer section higher in time accuracy can prevent such accidental discharge or charge-transfer. However, installation of such a higher accuracy timer section into both the voltage equalization circuit 3 and the microcomputer 4 may lead to a higher cost of the battery monitoring device. Therefore, the above embodiment of the present invention is significantly cost-effective.

Further, setting the circuit-side set time T1 for the circuit-side timer section 32 during the equalizing operation to be larger than the control-side set time T2 for the control-side timer section 40 enables the control-side timer section 40 to stop the equalizing operation prior to the circuit-side timer section 32 stopping the equalizing operation. That is, the equalizing operation is normally stopped by the control-side timer section 40. In cases where there exists a failure in the control-side timer section 40, the equalizing operation will be stopped by the circuit-side timer section 32.

In particular, setting the time accuracy of the control-side timer section 40 to be higher than that of the circuit-side timer section 32 as in the present embodiment gives priority to use of the control-side timer section 40, thereby allowing the equalizing operation to be more accurately stopped by the control-side timer section 40 than by the circuit-side timer section 32.

Still further, in the present embodiment, since the failure detecting process is performed on the microcomputer 4, it can be detected by the microcomputer 4 whether or not there exists a failure in the timer sections (in the present embodiment, the circuit-side timer section 32 and the control-side timer section 40), which leads to enhancement of reliability of the battery monitoring device 2.

Second Embodiment

Figure 2:
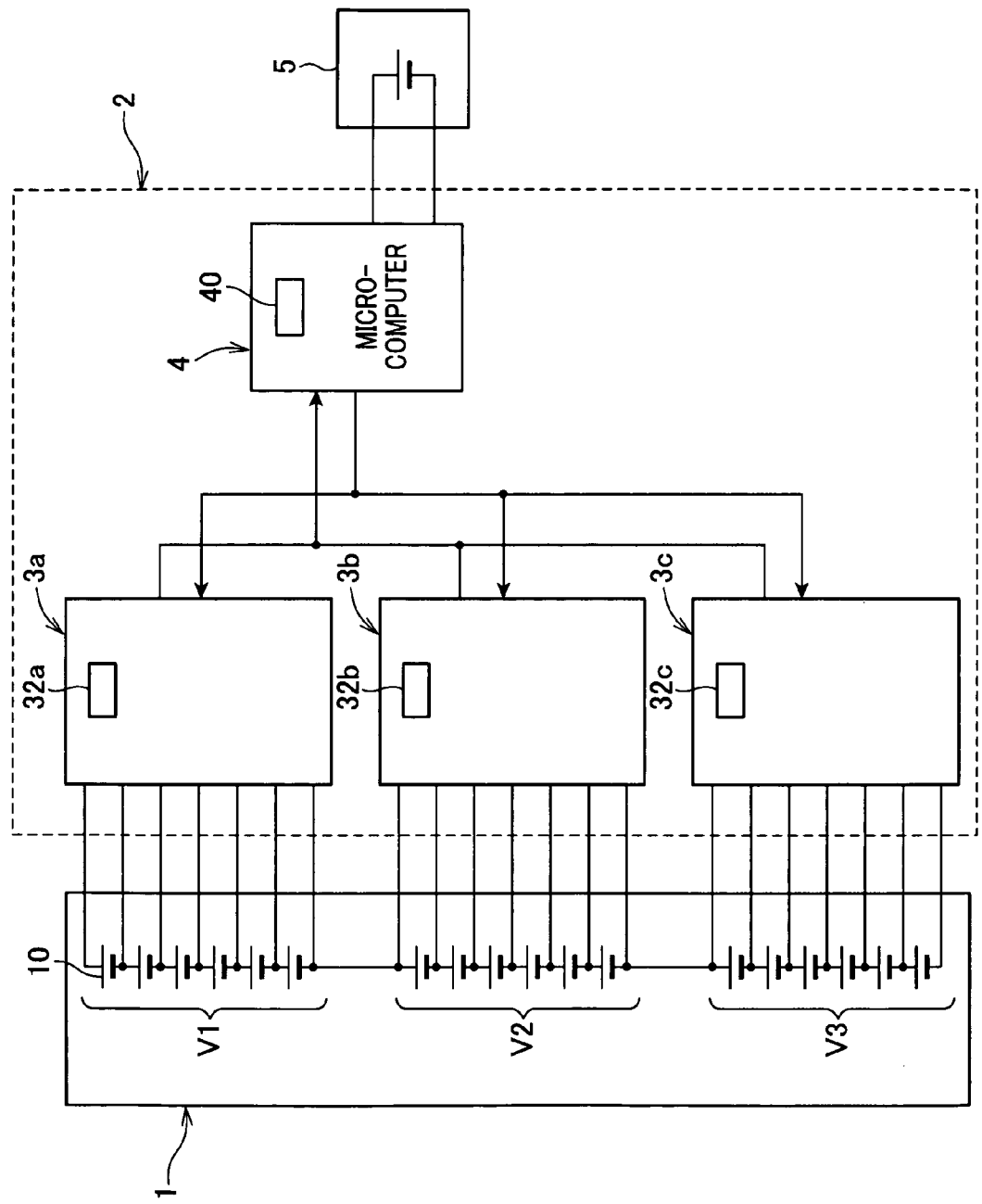
FIG. 2 is a schematic block diagram of a battery monitoring system in accordance with a second embodiment of the present invention.

There will now be explained a second embodiment of the present invention with reference to FIG. 2. FIG. 2 is a schematic block diagram of a battery monitoring system including a battery monitoring device of the second embodiment. Discharging sections (not shown) in the respective voltage equalization circuits 3a-3c of the present embodiment are each similar to the discharging section 30 in the voltage equalization circuit 3 of the first embodiment. Therefore, a detailed description about the discharging sections of the present embodiment will not be given below.

As shown in FIG. 2, the battery pack 1 of the present embodiment is composed of N unit batteries V1-VN (3 unit batteries V1-V3 in the present embodiment) being connected in series. Each unit battery is composed of a predetermined number of battery cells 10 (6 battery cells in the present embodiment) that are adjacent to each other.

The battery monitoring device 2 of the present embodiment is provided with a plurality of voltage equalization circuits 3a-3c associated with a plurality of unit batteries V1-V3, respectively. The voltage equalization circuits 3a-3c include first to third circuit-side timer sections 32a-32c, respectively. That is, the voltage equalization circuit 3a includes the first circuit-side timer section 32a, the voltage equalization circuit 3b includes the second circuit-side timer section 32b, and the voltage equalization circuit 3c includes the third circuit-side timer section 32c. First to third circuit-side set times T1 to define stop timing of the equalizing operation are set in the first to third circuit-side timer sections 32a-32c, respectively.

That is, the first circuit-side set time T1 is set in the first timer section 32a, the second circuit-side set time T1 is set in the second timer section 32b, and the third circuit-side set time T1 is set in the third timer section 32c. Since the voltage equalization circuits 3a-3c and the circuit-side timer sections 32a-32c of the second embodiment are similar to those of the first embodiment, their detailed explanation will not be given either. In some embodiments, the first to third circuit-side set times may be mutually different.

The microcomputer 4 of the present embodiment is connected to the first to third voltage equalization circuits 3a-3c, and performs various processes such as an instruction-signal outputting process to output instruction signals to the first to third voltage equalization circuits 3a-3c and a failure detecting process.

In addition, the microcomputer 4 of the present embodiment is adapted to perform a set-time correcting process to correct the set time for each timer section 32a-32c on the basis of count-value differences between count values of the first to third circuit-side timer sections 32a-32c and the control-side timer section 40.

There will now be explained the failure detecting process of the present embodiment. The microcomputer 4 of the present embodiment performs the failure detecting process to detect a failure in each of the voltage equalization circuits 3a-3c. During the equalizing operation being performed in each voltage equalization circuit 3, the microcomputer 4 detects count values resulting from the circuit-side timer sections 32a-32c and the control-side timer section 40 each counting a lapsed time after the start of the equalizing operation.

The microcomputer 4 then detects count-value differences between the detected count values of the timer sections 32a-32c and 40 by mutually comparing the detected count values in a round-robin fashion, and determines whether or not there exists a count-value difference that exceeds a normal range. If it is determined that there exists a count-value difference that exceeds the normal range, then it can be determined that there exists a failure in the timer sections 32a-32c, 40 of the battery monitoring device 2.

Subsequently, in the failure detecting process of the present embodiment, if it is determined that there exists a count-value difference that exceeds the normal range (if it is determined that "there exists a failure"), then the microcomputer 4 determines which timer section among the timer sections 32a-32c, 40 has a failure (or is malfunctioning) on a majority decision basis.

There will now be explained a specific example of the malfunctioning-timer determining process. The microcomputer 4 counts, for each timer section 32a-32c, 40, the number of count-value differences that exceed the normal range (the number of abnormalities) obtained by mutually comparing the detected count values of the timer sections 32a-32c, 40. The normal range is defined by a majority decision rule where the count values are divided into a plurality of groups in accordance with a distribution of the count vales and then the normal range is determined by the majority group. The microcomputer 4 then mutually compares the numbers of abnormalities for the timer sections (in the present embodiment, the number of abnormalities for the timer section 32a, the number of abnormalities for the timer section 32b, the number of abnormalities for the timer section 32c, and the number of abnormalities for the timer section 40), and then determines that the timer section with the largest number of abnormalities is regarded as a malfunctioning timer section.

There will now be explained a set-time correcting process. The set-time correcting process is a process to be performed while the mutual count-value differences between the detected count values of the timer sections 32a-32c and 40 are within the normal range.

For example, the microcomputer 4 determines which timer section among the timer sections 32a-32c and 40 has the lowest count-value difference, and sets the determined timer section as a reference timer section. For each non-reference timer section, i.e., each timer section other than the reference timer section, the microcomputer 4 corrects the set time for the non-reference timer section by calculating a correction time given by a count-value difference between the count value of the reference timer section and the count value of the non-reference timer section, and then adding the correction time to or subtracting the correction time from the set time for the non-reference timer section.

In the present embodiment, it possible not only to determine whether or not there exists a failure in the timer sections 32a-32c, 40, but also to determine which timer section has a failure, which leads to enhancement of reliability of the battery monitoring device 2.

In addition, in the present embodiment, a deviation in time accuracy of each timer section 32a-32c, 40 can be corrected, thereby improving a time accuracy of a lower accuracy timer section. Accordingly, this enables accidental discharge or charge-transfer to be effectively prevented from occurring in each battery cell 10.

The battery monitoring device 2 of the present embodiment includes four timer sections, i.e., the first to third circuit-side timer sections 32a-32c and the control-side timer section 40. Increasing only the time accuracy of the control-side timer section 40 can more advantageously reduce the cost of the battery monitoring device 2 than increasing time accuracies of the circuit-side timer sections 32a-32c.

In the present embodiment, it is possible to centrally control the stopping process of the equalizing operation in each of the plurality of voltage equalization circuits 3 through use of the control-side timer section 40 for the microcomputer 4.

Other Embodiments (1) In the above embodiments, the battery monitoring device 2 is composed of the voltage equalization circuit 3 and the microcomputer 4. The present invention, however, is not limited to the above embodiments. Alternatively, for example, in addition to the voltage equalization circuit 3 and the microcomputer 4, the battery monitoring device 2 may further include an overcharge and over-discharge monitoring circuit for monitoring overcharge and over-discharge in each battery cell 10.

(2) In the above embodiments, the voltage equalization circuit 3 and the microcomputer 4 are each provided with a timer section (the circuit-side timer section 32 for the voltage equalization circuit 3 and the control-side timer section 40 for the microcomputer 4). The present invention, however, is not limited to the above embodiments. Alternatively, for example, in addition to the circuit-side timer section 32 and the control-side timer section 40, a third timer section may be provided. Preferably, the third timer section may be supplied with electrical power from a third power source other than the power source for the microcomputer 4 and the power source for the voltage equalization circuit 3.

(3) In the above embodiments, the circuit-side set time T1 for the circuit-side timer section 32 is set to be larger than the control-side set time T2 for the control-side timer section 40. The present invention, however, is not limited to the above embodiments. Alternatively, for example, the circuit-side set time T1 may be set to be equal to the control-side set time T2 (i.e., T1=T2), or may be set to be equal to or larger than the control-side set time T2 (i.e., T1≥T2). These settings can also provide redundancy for the means for stopping the equalizing operation in the voltage equalization circuit 3, thereby allowing the equalizing operation to be stopped even in cases where either one of the timer sections is malfunctioning.

(4) In the above embodiments, the voltage equalization circuit 3 includes the discharging section 30 and the discharge-regulating section 31. The present invention, however, is not limited to the above embodiments. Alternatively, any other embodiments may be used where cell voltages of battery cells 10 are equalized.

Many modifications and other embodiments of the present invention set forth herein will come to mind to one skilled in the art to which the present invention pertains having the benefit of the teachings presented in the foregoing descriptions and the associated drawings. Therefore, it is to be understood that the present invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A battery monitoring device, comprising:
a voltage equalization circuit for equalizing cell voltages of a plurality of battery cells being connected in series and forming a battery pack; and
control means for outputting an instruction signal to instruct the voltage equalization circuit to start a voltage equalizing operation for the battery cells,
wherein the control means comprises a first timer section that stops the voltage equalizing operation a first predetermined set time after the start of the voltage equalizing operation, and
the voltage equalization circuit comprises a second timer section that stops the voltage equalizing operation a second predetermined set time after the start of the voltage equalizing operation.

2. The device of claim 1, wherein the voltage equalization circuit and the control means are supplied with electrical power from different power sources.

3. The device of claim 1, wherein the first timer section is higher in time accuracy than the second timer section.

4. The device of claim 1, wherein the first predetermined set time is equal to or less than the second predetermined set time.

5. The device of claim 1, wherein the first and second timer sections are each adapted to count a lapsed time after the voltage equalization circuit has started the equalizing operation upon reception of the instruction signal to instruct the voltage equalization circuit to start the voltage equalizing operation.

6. The device of claim 5, wherein the control means is adapted to output an instruction signal to instruct the voltage equalization circuit to stop the equalizing operation once the lapsed time counted by the first timer section after the start of the equalizing operation in the voltage equalization circuit has reached the first set time.

7. The device of claim 5, further comprising failure detection means for detecting a failure in the first and second timer sections by mutually comparing a count value corresponding to the lapsed time counted by the first timer section and a count value corresponding to the lapsed time counted by the second timer section to detect a count-value difference between the count values of the first and second timer sections, and then determining whether or not there exists a failure in the first and second timer sections on the basis of the detected count-value difference.

8. The device of claim 7, wherein the failure detection means is adapted to determine that there exists a failure in the first and second timer sections if the detected count-value difference exceeds a normal range.

9. The device of claim 8, wherein the normal range is defined by a sum of the time accuracy of the first timer section and the time accuracy of the second timer section.

10. The device of claim 7, wherein
the plurality of battery cells forming the battery pack are divided into a plurality of groups each consisting of a predetermined number of battery cells forming a unit battery,
the voltage equalization circuit comprises a plurality of voltage equalization circuits associated with the respective groups in one-to-one correspondence,
the second timer section comprises a plurality of second timer sections included in the respective voltage equalization circuits,
the failure detection means is adapted to detect a failure in the first timer section and the second timer sections by mutually comparing the count values of the first timer section and the second timer sections to detect count-value differences between the count values of the first timer section and the second timer sections, and in cases where some count-value difference exceeds a normal range, determine on a majority decision basis which timer section among the first timer section and the second timer sections has a failure.

11. The device of claim 10, the count value of the first timer section and the count values of the second timer sections are elapsed times counted by the first timer section and the second timer sections respectively after the voltage equalizing operation has been started in response to the instruction signal outputted from the control means to instruct the voltage equalization circuits to start the voltage equalizing operation.

12. The device of claim 11, wherein the normal range is determined by a majority decision process where the count values of the first timer section and the second timer sections are divided into a plurality of groups in accordance with a distribution of the count values, and then the normal range is defined by the majority group.

13. The device of claim 10, further comprising set-time correction means for correcting the set times for the first timer section and the second timer sections,
wherein the set-time correction means is adapted to determine which timer section among the first timer section and the second timer sections has the lowest count-value difference while the count-value differences between the count values of the first timer section and the second timer sections detected by the failure detection means are within the normal range, set the determined timer section as a reference timer section, and then correcting the set time for each of the other timer sections (also referred to as non-reference timer sections) with reference to the reference timer section.

14. The device of claim 13, the set-time correction means is adapted to correct the set time for each of the non-reference timer sections by calculating a correction time given by a count-value difference between the count value of the reference timer section and the count value of the non-reference timer section, and then adding the correction time to or subtracting the correction time from the set time for the non-reference timer section.

15. The device of claim 5, further comprising set-time correction means for correcting the set times for the first and second timer sections,
wherein the plurality of battery cells forming the battery pack are divided into a plurality of groups each consisting of a predetermined number of battery cells forming a unit battery,
the voltage equalization circuit comprises a plurality of voltage equalization circuits associated with the respective groups in one-to-one correspondence,
so the second timer section comprises a plurality of second timer sections included in the respective voltage equalization circuits,
the set-time correction means is adapted to correct the set times for the first timer section and the second timer sections by mutually comparing count values of the lapsed times counted by the first timer section and the second timer sections respectively to detect count-value differences between the count values of the first timer section and the second timer sections, and while the detected count-value differences between the count values of the first timer section and the second timer sections are within a normal range, determining which timer section among the first timer section and the second timer sections has the lowest count-value difference, setting the determined timer section as a reference timer section, and then correcting the set time for each of the other timer sections with reference to the reference timer section.

16. The device of claim 1, wherein
the plurality of battery cells forming the battery pack are divided into a plurality of groups each consisting of a predetermined number of battery cells forming a unit battery,
the voltage equalization circuit comprises a plurality of voltage equalization circuits associated with the respective groups in one-to-one correspondence,
the second timer section comprises a plurality of second timer sections included in the respective voltage equalization circuits.

17. The device of claim 1, comprising a microcomputer that implements the control means, the microcomputer being communicable with the voltage equalization circuit.

* * * * *